Aug. 13, 1968     D. W. SESSODY     3,396,637

HYDRAULIC RAM

Filed May 11, 1966

INVENTOR.
DONALD W. SESSODY
BY
Lieber & Nilles
ATTORNEYS

United States Patent Office 3,396,637
Patented Aug. 13, 1968

3,396,637
HYDRAULIC RAM
Donald W. Sessody, Milwaukee, Wis., assignor to Applied Power Industries, Inc., West Allis, Wis., a corporation of Wisconsin
Filed May 11, 1966, Ser. No. 549,318
2 Claims. (Cl. 92—240)

ABSTRACT OF THE DISCLOSURE

A hydraulic ram device having a piston assembly which includes a piston rod provided with a reduced end portion and an annular groove, the groove receiving a split ring which provides a bearing for an annular seal embracing the reduced end portion of the rod.

Background

It is customary practice to provide hydraulic ram devices consisting essentially of a cylinder having a bore in which a piston is mounted for reciprocal movement. Upon pressurization of the cylinder with hydraulic fluid introduced under pressure and under the control of an operator, the piston is extended to provide an operative action in the nature of a force application used in the performance of diverse work.

Since the pressurized fluid is admitted to the cylinder under high pressures, the sealing means between the bore of the cylinder and the piston is a critical element and must be effective to prevent leakage of the hydraulic fluid past the piston. The seal is normally carried by the piston and must be constructed to exert sufficient radial force between the bore of the cylinder and the piston to prevent leakages of pressurized fluid while also resisting the axial forces applied thereto and tending to displace the seal in an axial direction.

Various piston structures and seal arrangements have been heretofore proposed in an effort to provide proper and effective sealing between the piston and the bore of the cylinder while also preventing axial displacement of the sealing means on the piston. One of the most common arrangements for retaining the seal in position on the piston includes a reduction in the diameter of the piston at the inner end thereof for receiving the annular seal, the reduced end of the piston being threaded to receive a retaining nut or similar threaded fastener. While such an arrangement is simple and does effectively retain the seal in fixed position on the piston, the length of the piston must necessarily be objectionably increased so as to extend beyond the seal for receiving the retaining means, thus also reducing the effective stroke of the piston.

In efforts to utilize the full stroke of the piston while reducing the length thereof, it has also been heretofore proposed to form the piston with an annular flange adjacent its inner end to provide a seat for the seal, the seal being retained on the end of the piston by means of a split ring or the like. However, in such instances, the annular flange forming the seat or bearing surface for the seal to prevent axial movement thereof along the piston was formed integral with the piston and therefor required additional careful machining operations.

In an effort to avoid the extra machining operations necessitated by forming the annular bearing flange integral with the piston, it has also become common practice to separately machine a ring having an inner diameter corresponding to the outer diameter of the piston and to then secure the ring to the piston as by welding or the like. However, such construction also required additional work in the nature of careful machining and welding operations.

In still other instances, it has been proposed to retain the separately machined ring in proper position on the piston as by means of keys or locking devices, but such arrangements have also been objectionable because of the special machining operations required for the ring and the fasteners and the separate assembly operations necessitated for applying the ring and the fastener devices to the piston.

Summary

It is, therefore, an object of the present invention to provide an improved piston construction and seal retaining means therefor which obviates the aforesaid disadvantages and objections of prior devices of this type.

Another object of the present invention is to provide an improved seal arrangement and retaining means therefor which is extremely simple and economical and which minimizes the assembly operations while providing maximum efficiency in performance.

Still another object of the invention is to provide an improved piston for a hydraulic ram unit which has a novel and effective seal supporting and carrying means.

A further object of the present invention is to provide an improved piston construction for hydraulic ram units which includes novel means for easily and quickly assembling and dismantling the seal without need for utilizing special tools or the like.

In general, the present invention contemplates the provision of a sealing means carried by the piston of a hydraulic power unit for preventing leakage of hydraulic fluid between the cylinder bore and the piston, the improvement including a spit ring bearing mounted in a groove formed in the piston and extending radially therefrom. A resilient seal assembly embracing the peripheral portion of the piston adjacent the split ring is directly suported by the piston and positioned by the ring and coacts with the bore of the ram cylinder to provide a seal between the piston and the cylinder. To prevent extrusion of the resilient seal between adjacent surfaces of the split ring upon pressurization of the device, a back-up ring or washer in interposed between the seal and the ring.

The drawing

A clear conception of the invention and of the application thereof to a typical hydraulic power unit may be had by referring to the drawing accompanying and forming a part of this specification wherein like reference characters designate the same or similar parts in the several views.

Detailed description

Figure 4:
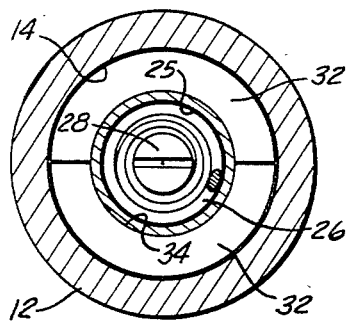
FIGURE 4 is a transverse section through the hydraulic ram device taken along the line 4—4 of FIGURE 1.

While the invention has been shown and described herein as being embodied in a hydraulic power unit of a particular construction wherein the piston is extendable from the bore of the cylinder for applying a positioning or spreading force and with a seal comprising certain components, it is not intended or desired to unnecessarily restrict or limit the invention by reason of such specific embodiment since the improvements may be used to advantage in other types of hydraulic power units which include a reciprocating piston and the sealing components may be varied to meet different operating conditions. It is also contemplated that certain descriptive terms used herein shall be given the broadest possible interpretation consistent with the disclosure.

Referring to the drawing, the typical hydraulic power unit shown therein as embodying the invention is indicated generally by the numeral 10. This power unit includes a cylinder 12 having a bore 14 entering one end thereof and extending co-axially into the cylinder. The bore 14 terminates at its inner end in a somewhat reduced portion 15 having a fluid passageway radiating therefrom. An inlet fitting 16 is screw threaded into the fluid passageway and is connected to a suitable source of supply for supplying hydraulic fluid under pressure to the reduced end of the bore 14. A shoulder 17 is thus formed between the reduced portion 15 and the larger portion of the bore 14.

Figure 1:
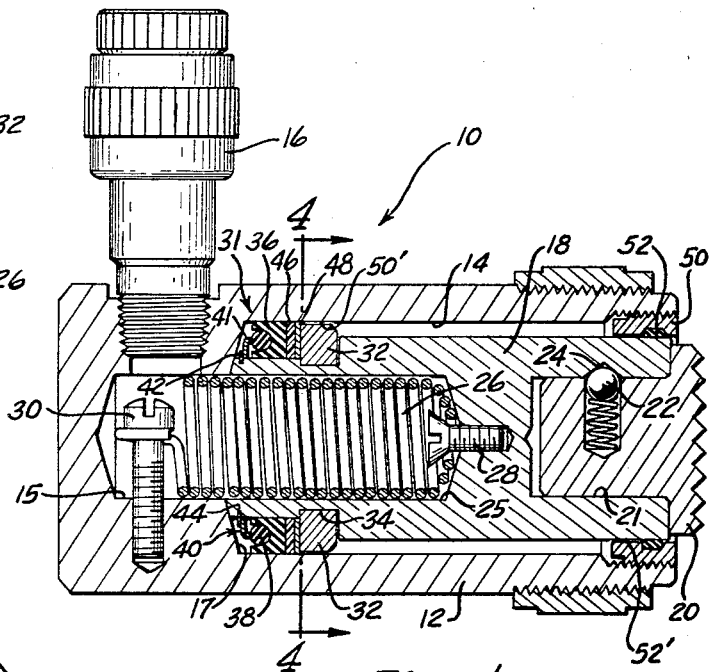
FIGURE 1 is a longitudinal section through a typical hydraulic power unit provided with a piston and seal assembly constructed in accordance with the invention.

A piston 18 enters the bore 14 through the open end thereof for reciprocal movement toward and away from the reduced portion 15 and the inlet communicating with the source of supply through the fitting 16. The piston 18 is cylindrical to conform with the shape of the bore but is of somewhat less diameter than that of the bore 14 of the cylinder 12. The length of the piston 18 is such that the inner end thereof abuts the shoulder 17 when the piston is fully retracted as shown in FIGURE 1.

The exposed outer end of the piston 18 may be provided with suitable means for interchangeably receiving work engaging members such as the saddle 20 shown in the drawing. The work engaging saddle or other interchangeable work engaging members may be removably retained within an end recess 21 in the piston 18 as by means of a spring loaded pawl 22 or the like engageable within a depression or detent 24 formed in the sidewall of the recess 21.

The inner end of the piston 18 may be formed with an axial recess or counter-bore 25 for housing a return spring 26 suitably secured at one end to the body of the piston 18 at the inner end of the recess 25 as by means of a machine screw 28 or the like. The other end of the spring 26 may, in turn, be secured to the cylinder 12 within the reduced portion 15 as by means of a machine screw or bolt 30. The spring 26 thus functions to return the piston 18 to its retracted position as shown in FIGURE 1 whenever the ram is de-energized.

To prevent leakage of hydraulic fluid introduced under pressure to the bore 14, 15 of the cylinder 12, the piston 18 is provided with a sealing assemblage 31 carried by the piston. As shown, the sealing assemblage includes a split ring bearing 32 for the seal carried in an annular groove 34 adjacent to the inner end of the piston 18. This split ring bearing 32 may be readily formed as a ring having an internal diameter approximately the same as the diameter of the groove 34 formed in the piston, the outer diameter of the ring 32 preferably being approximately equal to or slightly less than the diameter of the bore 14 of the cylinder 12, the ring being separated into two or more sections as by a cutting or sawing operation. Thus, the sections of the ring 32 may be readily placed within the groove 34, and once the piston 18 is assembled within the bore 14, the sections forming the split ring 32 are retained against displacement by the inner wall of the cylinder. As shown, the axial length of the ring 32 is approximately the same as the width of the groove 34 with some tolerance so as to be readily received within the groove.

The seal may consist of an annular sealing member 36 generally U-shaped in cross-section and receivable on the reduced end portion of the piston 18, the seal having its inner wall embracing the peripheral surface of the reduced end portion of the piston and have its outer wall snugly engaging the wall formed by the bore 14. The U-shaped annular seal 36 may be formed of any suitable resilient material such as rubber, neoprene, or the like adapted to conform readily to the wall of the bore 14 to effect a seal preventing escape of pressurized fluid past the seal. Seated within the annular recess of the cup-shaped seal 36 is a resilient O-ring 38 or the like acting to constantly urge the opposite walls of the seal into sealing engagement with the piston 18 and wall of the cylinder 12, respectively, the seating of the seal being augmented by fluid under pressure admitted to the bore of the cylinder.

The O-ring 38 may be suitably retained within the annular groove or recess of the seal 36 as by means of a retaining or spreader ring 40 also carried by the reduced end of the piston 18. As shown, the retainer or spreader ring 40 may be formed with a flange portion 41 bearing against the O-ring 38 with sufficient force to cause the O-ring 38 to snugly seat within the open groove of the seal 36, and the ring 40 is retained in position on the reduced portion of the piston 18 as by means of a snap ring 42 or the like received within an outwardly open slot 44 at the outer end of the reduced portion of the piston 18.

It is thus apparent that the seal 36 is held against axial displacement on the reduced portion of the piston 18 by bearing ring 32 and the combined action of the rings 40, 44 the split ring 32 thus acting as a bearing for the seal. The seal assembly also preferably includes one or more backup rings or washers 46, 48 against which the resilient member 36 is directly seated to thereby prevent extrusion of the resilient sealing member 36 through the adjacent surfaces of the split ring bearing 32. These washers should be of sufficient width and strength to withstand high pressures while preventing extrusion of the resilient seal elements in an axial direction upon pressurization of the ram cylinder, and the seal elements 36, 38, 46 should snugly fit between the washer 48 and the retaining ring 40. The seal assemblage is accordingly effectively both supported and retained in position on the plunger 18 by the split bearing ring 32.

Figure 3:
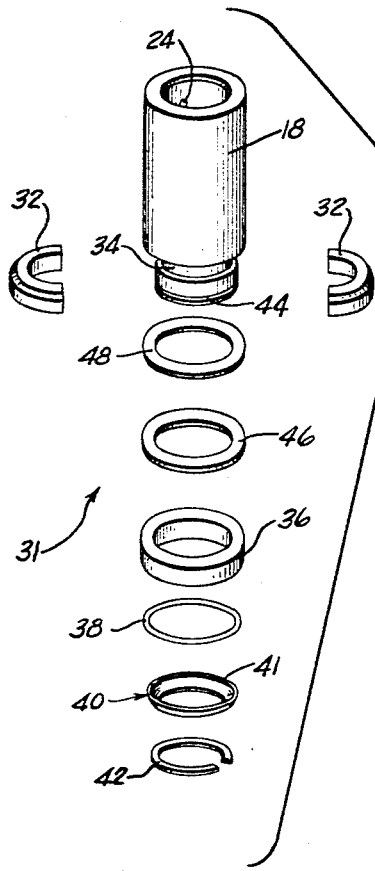
FIGURE 3 is an exploded perspective view of the piston and seal assembly embodying the improvements.

The improved arrangement utilizing the split bearing ring 32 greatly facilitates the assembly of the entire sealing assemblage on the piston 18 without need for special tools or fasteners. The assembly operation is quite apparent from reference to FIGURES 2 and 3 which illustrates the various elements in assembled and disassembled condition. In applying the sealing assemblage, the sections comprising the split ring bearing 32 are first placed within the groove 34 in the piston 18. The backup washers 46, 48 are then slid over the reduced end of the piston 18 and are positioned in abutting relation to the split ring bearing 32. The U-cup seal 36 may then likewise be slid over the reduced portion of the piston 18 so as to seat against the adjacent backup washer, and the O-ring 38 is seated within the outwardly open groove in the seal 36. Finally, the spreader ring 40 and snap ring 42 are applied to the reduced portion of the piston 18 in an obvious manner so that the snap ring 42 is retained in the groove 44 to thereby hold the seal assembly 31 in position on the piston.

Figure 2:
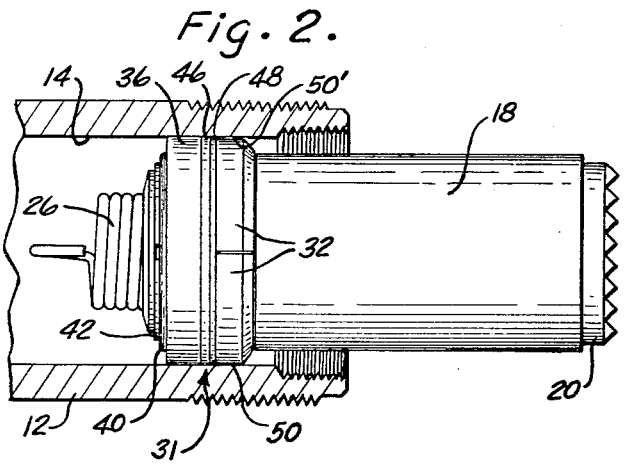
FIGURE 2 is a fragmentray part sectional view of the hydraulic power unit with the piston being inserted within the bore of the cylinder during assembly of the device.

The piston 18 with the seal assembly 31 carried thereby may then be inserted into the open end of the core 14 of the cylinder 12 as shown in FIGURE 2. After insertion of the piston within the cylinder in the manner described, a stop ring 50 is threaded or otherwise suitably secured within the open end of the bore 14 to thereby provide a stop which is adapted to cooperate with the split bearing ring 32 to prevent displacement of the piston 18 from the cylinder. The stop ring 50 is also preferably provided with a resilient wiper ring 52 as shown which co-acts with the peripheral wall of the piston during reciprocation thereof.

In operation, the piston 18 is normally held by the spring 26 in retracted position within the cylinder 12 as shown in FIGURE 1 with the end of the piston 18 abutting the shoulder 17. Then, as hydraulic fluid under pressure is admitted to the bore of the cylinder 10 under control of an operator, the piston 18 is caused to extend away from its seat until the pressure has been released or until such time as the bearing ring 32 is stopped from further movement by the stop ring 50. The pressure is, of course, also exerted against the seal 36 which bears on the split ring bearing 32 through the washers 46, 48, and the O-ring 36 along with the hydraulic pressure acting on the grooved face of the seal 36 causes the seal to tightly engage the wall of the bore 14 to form a tight fluid seal. Upon release of the hydraulic pressure from the cylinder 10, the spring 26 functions to automatically again return the piston 18 to its retracted position. By virtue of the fact that the seal 36 is backed by the washer or washers 46, 48, the amount of material removed between the sections of the bearing ring 32 by the cutting or sawing operation is immaterial since the backup washers do prevent extrusion of the resilient seal through the adjoining surfaces of the sections of the bearing ring.

It should be noted that with the ram cylinder pressurized and the piston 18 in its fullest extended position, the split bearing ring 32 is dead ended against the stop ring 50 and therefore takes the full load in the annular groove 34. Also, by virtue of the diametrical tolerance between the outside diameter of the split bearing ring 32 and the inside diameter of the bore 14 of the cylinder 12 as indicated at 50′ coupled with the clearance allowed between the inside diameter of the stop ring 50 and the outside diameter of the piston 18 as indicated at 52, the piston 18 will tilt somewhat under eccentric loads. However, due to the tolerance provided between the split bearing ring 32 and the annular groove 34 as a result of the splitting of the ring by sawing or the like, the bearing ring will always tend to ride parallel to the bore, thus reducing wear on the split bearing ring and on the seal assembly. This condition is only made possible by reason of the fact that the split bearing ring is loosely retained in the annular groove and is free of any attaching means whatsoever. It should additionally be understood that the seal 36 may be of other desired configurations and may be spaced axially from the split ring 32 if desired.

Various modes of carrying out the invention are contemplated as being within the scope of the following claims particularly pointing out and distinctly claiming the subject matter that is regarded as the invention.

I claim:

1. A piston assembly for a hydraulic power cylinder having a piston receiving bore communicable at its inner end with a source of pressurized fluid, said piston assembly comprising, a piston rod having an annular outwardly open groove spaced from the inner end thereof, said piston rod being of smaller diameter than the main body portion of said rod beyond the annular groove, a split ring consisting of at least two sections removably seated within the annular groove and radiating outwardly from the peripheral surface of the main body portion of said rod, said split ring having plain radiating surfaces and being of less width than the annular groove and of smaller outside diameter than the piston receiving bore, an annular sealing member formed of resilient material snugly embracing the reduced diameter portion of said rod beyond said split ring, said annular sealing member being formed for sealing coaction with the wall of the piston receiving bore, means for preventing axial displacement of said annular sealing member from said rod end, and a disc-shaped metal ring interposed between said split ring and said annular sealing member to provide a backing for said sealing member and prevent extrusion thereof toward said split ring upon admission of hydraulic fluid under pressure to the bore of the cylinder, said metal ring having a plain surface cooperable with the adjacent plain surface of said split ring to thereby permit the split ring to move freely within its receiving groove upon eccentric loading of the piston.

2. A piston assembly according to claim 1, wherein a disc-shaped non-metallic ring is interposed between the metal ring and the annular sealing member.

References Cited

UNITED STATES PATENTS

| | | | |
|---|---|---|---|
| 1,362,435 | 12/1920 | Neraas | 92—251 X |
| 1,494,243 | 5/1924 | Hills | 92—258 X |
| 2,417,887 | 3/1947 | Schmidt | 92—250 X |
| 2,566,994 | 9/1951 | Phipps | 92—258 X |
| 2,658,809 | 10/1953 | Schultz | 92—258 X |
| 2,785,025 | 3/1957 | Wilson | 92—251 |
| 3,146,683 | 9/1964 | Hoffman | 92—252 X |
| 3,312,150 | 4/1967 | Strader | 92—252 |

FOREIGN PATENTS

| | | |
|---|---|---|
| 889,106 | 2/1952 | Great Britain. |

MARTIN P. SCHWADRON, *Primary Examiner.*

G. N. BAUM, *Assistant Examiner.*